UNITED STATES PATENT OFFICE.

MARTIN ROHMER, OF GERSTHOFEN, NEAR AUGSBURG, GERMANY, ASSIGNOR TO FARBWERKE VORM. MEISTER LUCIUS & BRÜNING, OF HÖCHST-ON-THE-MAIN, GERMANY, A CORPORATION OF GERMANY.

PROCESS OF PRODUCING NITROGEN SIMULTANEOUSLY WITH OXIDS OF NITROGEN.

1,096,393.

Specification of Letters Patent. Patented May 12, 1914.

No Drawing. Application filed December 22, 1913. Serial No. 808,262.

*To all whom it may concern:*

Be it known that I, MARTIN ROHMER, Ph. D., chemist, a citizen of the Empire of Germany, residing at Gersthofen, near Augsburg, Germany, have invented certain new and useful Improvements in the Process of Producing Nitrogen Simultaneously with Oxids of Nitrogen, of which the following is a specification.

In U. S. patent-application No. 746,958, filed 7th February 1913, is described a process for producing nitrogen and oxids of nitrogen by burning ammonia in atmospheric air, the essential feature of which is that there is no excess of oxygen in the reacting-mixture of ammonia of high concentration and air, so that, after the separation of lower or higher oxids of nitrogen, pure atmospheric nitrogen is obtained. In carrying out this process on a large scale, I have made the observation that it is necessary to avoid a detrimental overheating of the gas-mixture to be burnt, particularly if the extension of the contact is only small and if there is, consequently, a great rise of the temperature. Now I have furthermore found that this object can be attained by introducing into the said mixture an indifferent gas, for example a certain quantity of the nitrogen which is produced in the course of the process itself. Thus, for instance, by introducing 23 parts by volume of nitrogen, the absolute concentration of the ammonia in a mixture of air and ammonia containing 12.3 per cent. of ammonia (as described in Example II of U. S. patent application Ser. No. 746,958, above referred to) may be reduced to ten per cent. without the nature of the reaction-products being altered thereby.

A mixture of this character, when burned, yields nitric oxid (NO), affording excellent yields. After cooling, the quantity of the residual oxygen is sufficient only for the conversion of one-half of the nitric oxid into nitrogen tetroxid. Thus, a mixture of nitric oxid (NO) and nitrogen tetroxid ($N_2O_4$) is produced, which mixture, when further cooled, forms nitrogen trioxid ($N_2O_3$). By absorption in caustic soda lye, the latter is most easily and completely converted into the valuable sodium nitrite.

Having now described my invention, what I claim is:

1. The process of producing nitrogen and oxids of nitrogen, which consists in burning ammonia with atmospheric air into which an indifferent gas is introduced, the reaction-mixture containing a high percentage of ammonia and just sufficient oxygen to oxidize the hydrogen-component of the ammonia to water and its nitrogen-component to lower or higher oxids of nitrogen.

2. The process of producing nitrogen and oxids of nitrogen, which consists in burning ammonia with atmospheric air into which nitrogen is introduced, the reaction-mixture containing a high percentage of ammonia and just sufficient oxygen to oxidize the hydrogen-component of the ammonia to water and its nitrogen-component to lower or higher oxids of nitrogen.

In testimony whereof I affix my signature in presence of two witnesses.

MARTIN ROHMER.

Witnesses:
A. V. W. COTTER,
ULRIKE ROEDER.